United States Patent [19]

Esswein

[11] Patent Number: 4,515,439
[45] Date of Patent: May 7, 1985

[54] ATTACHMENT OF MICROSCOPE OBJECTIVES

[75] Inventor: Karlheinz Esswein, Aalen-Unterkochen, Fed. Rep. of Germany

[73] Assignee: Carl-Zeiss-Stiftung, Heidenheim/Brenz, Oberkochen, Fed. Rep. of Germany

[21] Appl. No.: 451,860

[22] Filed: Dec. 21, 1982

[30] Foreign Application Priority Data

Jan. 27, 1982 [DE] Fed. Rep. of Germany ....... 3202461

[51] Int. Cl.³ .......................... G02B 7/02; F16D 1/00
[52] U.S. Cl. ..................................... 350/257; 403/343
[58] Field of Search ............... 350/242, 252, 257, 520; 354/286; 403/343, 349

[56] References Cited

U.S. PATENT DOCUMENTS

| | | | |
|---|---|---|---|
| 287,904 | 11/1883 | Bulloch | 350/257 |
| 817,672 | 4/1906 | Sansom | 403/349 |
| 1,662,339 | 3/1928 | Sabel | 350/252 |
| 2,401,367 | 6/1946 | Nagel | 350/257 |
| 2,496,928 | 2/1950 | Bing et al. | 350/252 |
| 2,780,137 | 2/1957 | Bourgeois | 350/257 |
| 3,142,239 | 7/1964 | Meixner | 350/252 |
| 3,782,261 | 1/1974 | Araki | 350/257 |
| 4,266,855 | 5/1981 | Mohr | 350/257 |

*Primary Examiner*—William H. Punter
*Attorney, Agent, or Firm*—Hopgood, Calimafde, Kalil, Blaustein & Judlowe

[57] ABSTRACT

The invention contemplates use of a bayonet mount for microscope objectives, instead of the customary threaded mounting of such objectives. The bayonet mount is characterized by the objective (1) having a centering cone (3) which engages and precisely centers in a conical opening (10) in the turret of the microscope. The structure not only permits rapid changing of the objective, but the thus-mounted objective always assumes the same accurately centered angular position with respect to the microscope housing.

Each objective can therefore carry exposed coded indicia, containing technical data concerning the objective, and the coding may be read by a reading device which is fixed with respect to the microscope housing. The code which is read for the objective indexed into working position may be used for aperture control in the microscope.

15 Claims, 7 Drawing Figures

ATTACHMENT OF MICROSCOPE OBJECTIVES

BACKGROUND OF THE INVENTION

The present invention relates to mounting structure for the replaceable attachment of objectives to microscopes.

As a general rule, microscope objectives have a fine thread by which they are removably mounted to the turret of a microscope. For more than a century, this type of mounting has been used exclusively for microscope objectives since it well satisfies existing requirements, among other things, for an accurately centered seating of the objective. With a threaded attachment, the mounted angular position of the part which is threaded-in is not fixed so that, for example, legends on the objective housing frequently are no longer legible after threaded advance into the objective turret. Thus far, this disadvantage has always been tolerated, along with the relatively cumbersome process of threaded advance into (or retraction from) the fully mounted position.

In other fields of optics, for example photo-optics, it has long been known to attach objectives via a so-called bayonet mount to the involved camera. The bayonet mount permits rapid change of the objective and also assures that the objective is always locked in the same angular position so that, for example, actuating devices and scales for aperture, distance, etc., are always accessible to the user at the same angular location.

However, with respect to centering accuracy, much less stringent demands are made on the mounting of a camera objective than on the mounting of a microscope objective since, in a camera, the film plane lies directly behind the objective, and lateral offset of the image on film to be exposed is, as a rule, without deleterious effect. Bayonet attachments for interchangeable photographic objectives, therefore, have flat reference surfaces against which corresponding mating surfaces of the objective are pressed by spring means, in the course of making the bayonet engagement.

In microscopes, the objective is one of a plurality of optical elements whose axes must be accurately aligned with the axis of the objective if the quality of the microscopic image is not to be impaired. For this reason, it is not possible to provide microscope objectives with a locking bayonet mount as used for photo objectives.

BRIEF STATEMENT OF THE INVENTION

The object of the present invention is to provide simple and easily removable mounting structure for microscope objectives, which structure locks the objective with centered accuracy and in a predetermined angular position on the microscope housing. This object is achieved in a bayonet mount which relies upon engagement of convex and concave conical surfaces in the mounted position of the objective.

The advantage for the user of a microscope equipped with such a mount is that the bayonet engagement enables rapid and convenient replacement, requiring merely a rotation of the objective by, at most, about 90°.

A centering cone on the objective, in combination with a conical opening of the bayonet lock, assures simple and precise centering and maintenance of image position in the microscope.

Since the mounted angular position of the objective is determined by the bayonet lock, not only are indicia on the objective always at the same angular location but, in addition, there is the possibility of suitably coding technical data on the objective; such data may, for example, pertain to imaging performance (scale, aperture, etc.), and the data can then be detected by a reading device carried by the microscope, for use in the control of apparatus functions, such as aperture setting, indicating devices, etc. Such control can be achieved only with great difficulty in the case of a thread-mounted objective.

The coding itself may be illustratively effected by electrical contacts, via mechanical switches, or by optical scanning, it being advantageously detected by a reading device by which the coding can be read statically, in the working position of the objective; alternatively, the coding may be read dynamically, upon indexed rotation of a turret-mounted objective into operating position.

DETAILED DESCRIPTION

The invention will be described in detail in conjunction with the accompanying drawings, in which.

Figure 4A:
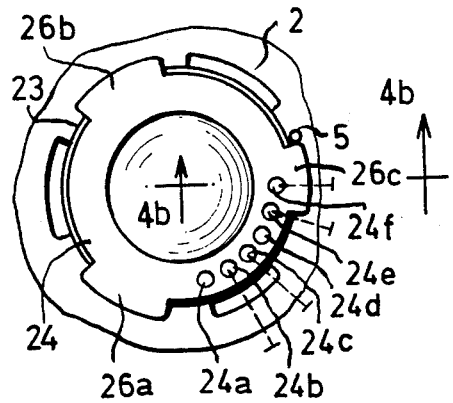
FIG. 4a is a view similar to FIG. 2, to illustrate modified encoding of a microscope objective.
Figure 4B:
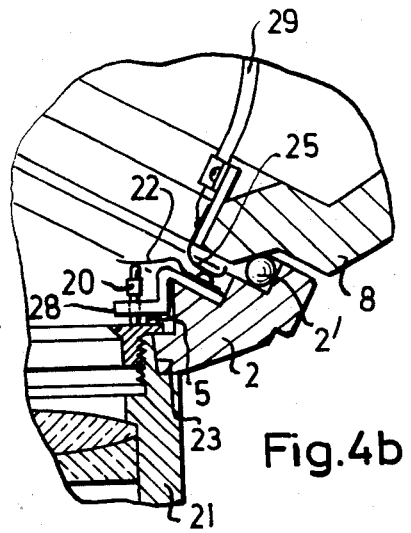
Figure 5A:
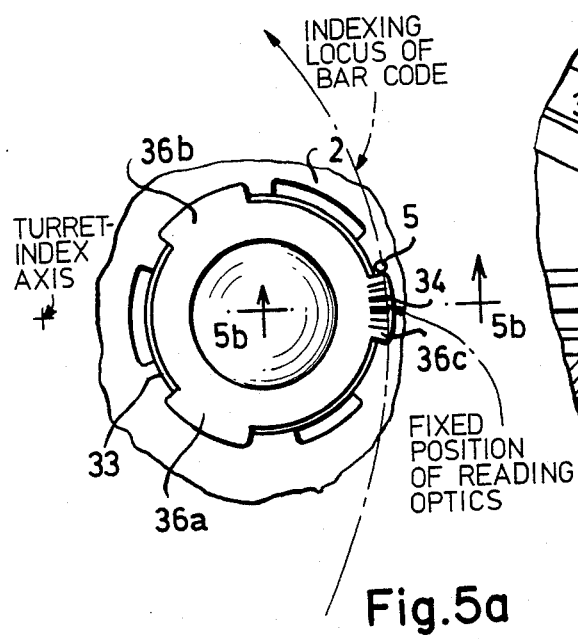
Figure 5B:
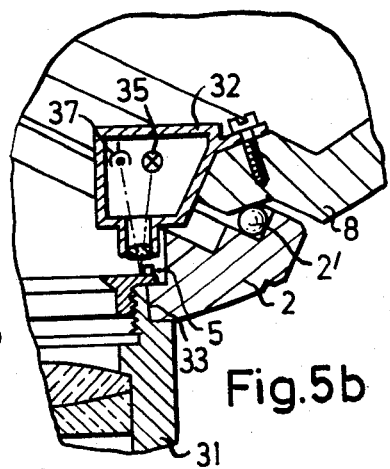

FIG. 4b is an enlarged fragmentary section taken in the plane 4b—4b of FIG. 4a; and FIGS. 5a and 5b are views corresponding to FIGS. 4a and 4b, to illustrate another code and code-reading technique.

Figure 1:
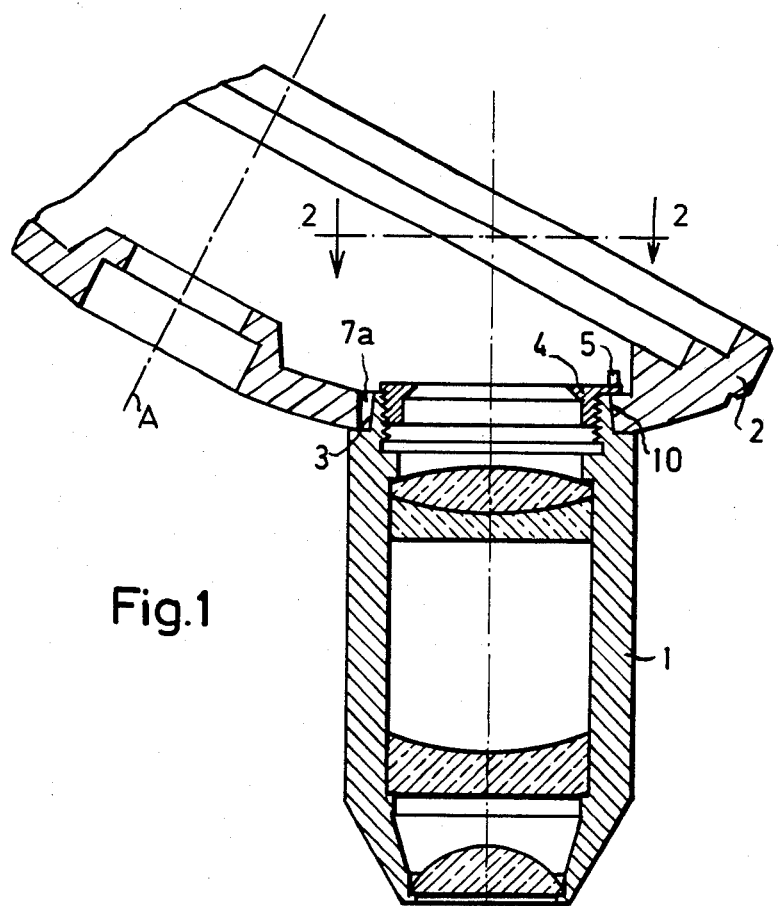
FIG. 1 is a longitudinal section through a turret-mounted microscope objective, in accordance with the invention.
Figure 2:
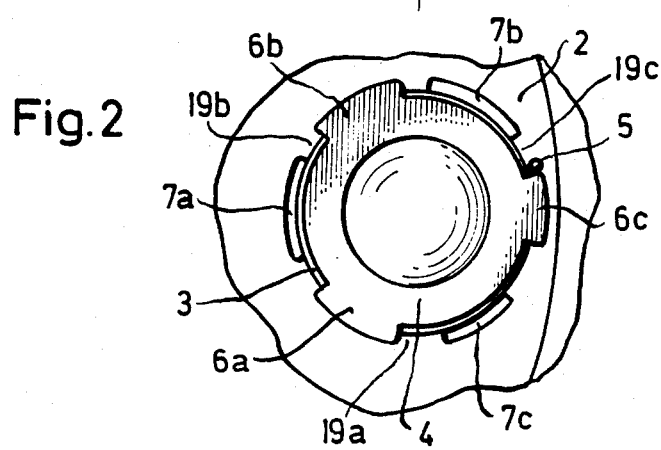
FIG. 2 is a forward-aspect view of the mount of FIG. 1, i.e., as viewed from the plane 2—2 of FIG. 1.

In FIG. 1, the image end of a microscope objective 1 has a convex conical surface 3 and carries a threaded insert 4 which, as shown in FIG. 2, has three radially outward lugs 6a, 6b, 6c. These lugs are of resilient material and have a somewhat asymmetrical shape, i.e., lugs 6a, 6b, 6c are of non-uniform angular extent, thus assuring that the lugs 6 of the objective 1 can be introduced only in a single angular position through three corresponding cut-outs 7a, 7b, 7c in the concave conical opening 10 of an objective turret 2. Turret 2 will be understood to be an indexible part of a microscope, otherwise not shown in FIG. 1, the turret-index axis being designated A. Attachment of objective 1 to turret 2 is effected by angular rotation of objective 1 after introduction, whereby the resilient lugs 6 are axially bent as they ride ramp-contoured inner sides of shoulders 19a, 19b, 19c of the turret 2, thus pressing the conical surface 3 of the objective firmly against the mating conical surface 10 in the turret 2. A stop 5 limits this angular rotation.

Figure 3:
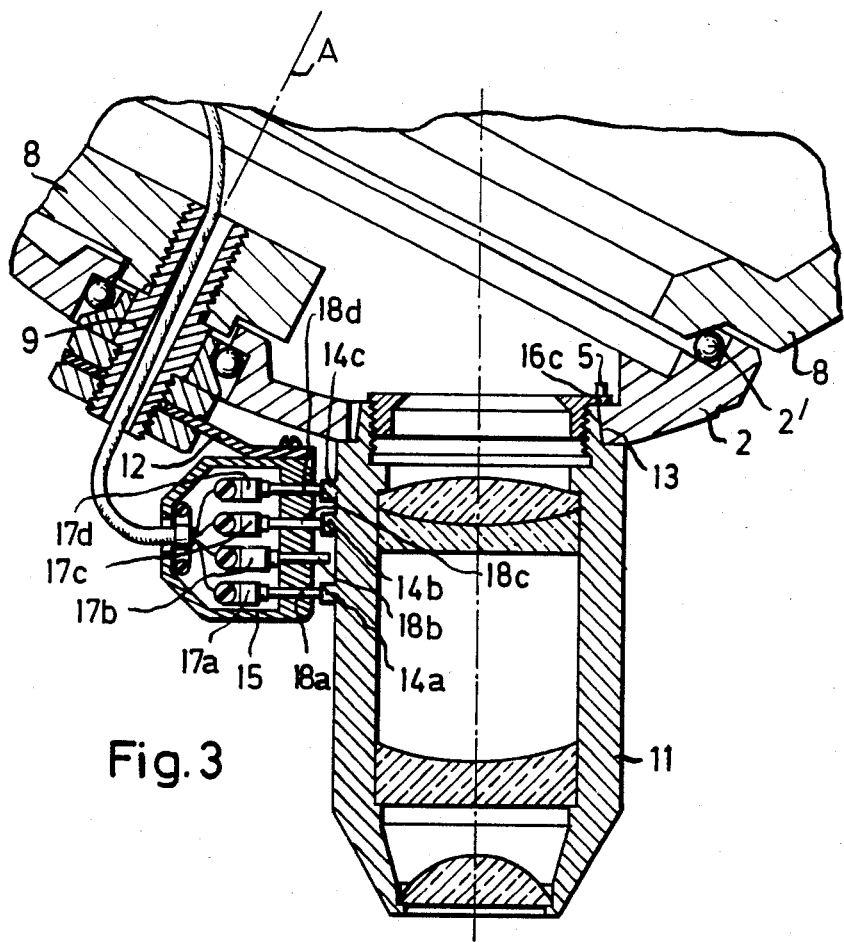
FIG. 3 is a longitudinal section to show an encoded modification of the embodiment of FIG. 1, expanded by a code-reading device.

FIG. 3 shows an embodiment in which objective 11 is provided at one locale of its outer circumference with several elevations 14a, 14b, 14c which form a code which may, for example, describe the imaging scale and the aperture of the objective. This code is read by a reading device 15 which is carried by a yoke or arm 12 fixed to a hollow shaft 9 secured to a part 8 of the microscope housing. The hollow shaft 9 is on the turret axis A; and turret 2 is indexible about shaft 9, via ball-bearing elements 2', FIG. 3 showing objective 11 after it has been swung into working position.

The reading device 15 contains four microswitches 17a, 17b, 17c, 17d which are poised for actuation by the code elevations 14, via movably guided pins 18a, 18b, 18c, 18d, as objective 11 is swung into its working position. A cable conducts the binary information from the reader 15 through hollow shaft 9 to a control unit (not shown) carried by the part 8 of the microscope housing; such binary information may be used, for example, to set the aperture diaphragm to a value corresponding to the objective aperture.

In the embodiment of FIGS. 4a and 4b, an objective 21 with a cone 23 and a threaded insert 24 has electric contacts 27 (a to f) which may be either insulated or wired against ground to thereby form a digital code which is transmitted via contact pins 20 movably carried by a yoke 28; transmission is completed via the involved resilient ends 22 of a multiple-contact strip mounted to the interior wall of turret 2. Each of the objective mounts in the turret 2 of FIGS. 4a and 4b has such a contact strip.

A device 25 for reading the code involved with the particular objective 21 (when indexed into working position) is fixedly carried by part 8 of the microscope housing, within the turret. Device 25 is shown (by dashed radial lines in FIG. 4a) to comprise five spring contacts and associated cable 29 for control or other use of the coding of the objective 21 which is in working position.

The above-described embodiments illustrate objective mounts with an encoding which is electrically or mechanically readable, when the objective is in its working position, i.e., the reading occurs for a static condition of lens positioning. The invention is, however, also applicable to a dynamic-reading situation, as illustrated by the embodiment of FIGS. 5a and 5b.

In the embodiment of FIGS. 5a and 5b, a bar code 34 applied to the spring lug 36c of an objective 31 mounted to turret 2 is scanned optically, and, as a matter of fact, dynamically, as the turret is indexed to swing the objective below the optical system of a reading unit 32, fixedly mounted to the housing 8. The reading device 32 is a reflected-light unit of conventional construction, containing a light source (photodiode) 35 and a photoelectric receiver 37. Output pulses of receiver 37 are produced in the course of swinging the turret 2 and will be understood to be fed to evaluation and storage means of known construction, so that the latter need not be described herein.

What is claimed is:

1. In combination, a microscope having an objective mount on an objective axis, and an objective having a housing adapted at one end for detachable assembly to said mount in centered relation to said axis, said mount being characterized by angularly spaced concave conical seat portions of a single geometric cone that is concentric with said axis, thereby establishing angularly spaced axial passages between said seat portions, said one end of said objective housing being characterized by a circumferentially continuous convex conical seat conforming to said geometric cone and coaxial with the axis of said objective, said convex conical seat being near but at axial offset from said one end, and radially outward bayonet-locking lugs at said one end of said objective housing, said lugs being radially and angularly limited to permit axial insertion of said one end into said mount and via said passages to the extent limited by convex-to-concave conical-surface engagement, and said mount being adapted to accept locking engagement with said lugs upon partial rotation of said objective housing in said mount when said conical surfaces are engaged.

2. The combination of claim 1, in which the angular extent of said lugs and spacings is non-uniform and establishes a single unique angle of insertional entry of said one end into said mount, and coacting stop formations on said mount and housing for limiting the angular extent of partial rotation to achieve a bayonet-locked relation.

3. The combination of claim 1, in which the angular extent and spacing of said seat portions is non-uniform and establishes a single unique angle of insertional entry of said one end into said mount, and coacting stop formations on said mount and housing for limiting the angular extent of partial rotation to achieve a bayonet-locked relation.

4. In combination, a microscope having an objective mount on an objective-mounting axis, and an objective having a housing adapted at one end for detachable assembly to said mount in centered relation to said axis, said mount being characterized by mounting-seat means that is concave and true to a first single geometric cone concentric with said axis, said one end of said objective housing being characterized by seating means that is convex and true to a second single geometric cone which matches said first cone and is coaxial with the axis of said objective, and releasably engageable bayonet-locking formations at said mount and at said one end of the objective housing and so axially related to said mounting-seat means and to said seating means as to assure their retained engagement when said bayonet-locking formations are in engaged relation.

5. The combination of claim 4, in which said microscope has a rotatable turret adapted for multiple-lens mounting at angularly spaced mounting locations which are successively indexible into registry with said objective-mounting axis, said objective mount being at one of said mounting locations.

6. The combination of claim 4, in which said releasably engageable bayonet-locking formations are uniquely interengageable at a single angular relation of said objective housing with respect to said objective mount.

7. The combination of claim 6, in which said objective housing has coded indicia at said one end and said objective mount has code-reading means positioned to read said coded indicia when said objective mount and objective housing are in bayonet-locking engaged relation.

8. The combination of claim 7, in which said coded indicia are in the form of electrical contacts in code-spaced array, and in which said reading device statically taps said contacts at or near the bayonet-locking engaged relation.

9. The combination of claim 7, in which said coded indicia are in the form of elevations or depressions on the objective housing, and in which said code-reading means comprises electrical switches positioned for actuation by the coded elevations or depressions at or near the bayonet-locking relation.

10. The combination of claim 7, in which said coded indicia comprise an optical code on the objective housing, and in which said code-reading means is an optical-code reading device.

11. The combination of claim 10, in which said optical code is a bar code.

12. The combination of claim 5, in which said releasably engageable bayonet-locking formations are uniquely interengageable at a single angular relation of said objective housing with respect to said objective mount; in which said objective housing has coded indicia at said one end; and in which code-reading means fixedly carried by said microscope is positioned to detect said coded indicia in the course of an indexing rotation of said turret.

13. The combination of claim 7, in which said coded indicia contain technical data pertaining to the objective.

14. The combination of claim 12, in which said coded indicia contain technical data pertaining to the objective.

15. In combination, a microscope having an objective mount on an objective-mounting axis, and an objective having a housing adapted at one end for detachable assembly to said mount in centered relation to said axis, said mount being characterized by mounting-seat means that is true to a first geometric cone concentric with said axis, said one end of said objective housing being characterized by seating means that is true to a second single geometric cone that is coaxial with the axis of the objective, said cones being respectively concave and convex and of matching slope for concentric seating, and releasably engageable bayonet-locking formations at said mount and at said one end of the objective housing and so axially related to said mounting-seat means and to said seat means as to assure their retained engagement when said bayonet-locking formations are in engaged relation.

* * * * *